United States Patent [19]

Budrose

[11] 4,055,905
[45] Nov. 1, 1977

[54] TEACHING TYPEWRITER

[75] Inventor: Charles R. Budrose, Melrose, Mass.

[73] Assignee: Upaya, Inc., Saugus, Mass.

[21] Appl. No.: 698,411

[22] Filed: June 21, 1976

[51] Int. Cl.$^2$ .......................................... G09B 13/00
[52] U.S. Cl. ..................................... 35/5; 197/107
[58] Field of Search ....................... 35/5, 6; 197/107

[56] References Cited

U.S. PATENT DOCUMENTS

| 3,166,856 | 1/1965 | Uttal | 35/6 |
| 3,234,664 | 2/1966 | Yaeger | 35/5 |
| 3,573,372 | 4/1971 | Talone | 197/107 X |

FOREIGN PATENT DOCUMENTS 2,133,619   2/1973   Germany .............................. 197/107

OTHER PUBLICATIONS

"Improved Educational Dissectible Transformer", p. 371, L. E. Knott, Apparatus Co. Catalogue, Rec'd. Jan. 1917.

Primary Examiner—Harland S. Skogquist
Attorney, Agent, or Firm—Wolf, Greenfield & Sacks

[57] ABSTRACT

A system for facilitating the learning of typing by permitting only the proper finger to operate each key. The operator wears a pair of gloves having each finger wired separately to a group of electromechanical devices each for enabling or inhibiting depressing of a key depending upon whether the proper key is being depressed. Each finger has a conductive pad which completes a circuit upon contact with or slight depression of the proper key, or at least proper group of keys, for operating the electromechanical device associated with that key to enable operation of the key. A separate enabling circuit is associated with each finger. If an improper finger is used to depress a key then the circuit is not completed through the finger wire and associated conductive path and the key that is about to be depressed has its associated electromechanical device in a position to inhibit operation of that key. The circuitry of this system comprises a transformer having ten independent secondary coils each one associated with a finger (or thumb) for operating a fixed number of relays each associated with a key of the typewriter. The circuit for operating a relay coil is completed through a conductive tab on the key and contacts associated with and responsive to at least slight depression of the key.

11 Claims, 2 Drawing Figures

TEACHING TYPEWRITER

BACKGROUND OF THE INVENTION

The present invention relates in general to an improved technique for facilitating the learning of typing on a typewriter. More particularly, this invention pertains to a teaching typewriter that eliminates or at least minimizes the occurence of certain errors and essentially permits only the proper finger to operate each key.

The teaching of typing on a typewriter is usually to rote and certain practice techniques have been developed where a predetermined finger is meant to operate only a predetermined group of keys and no others. Many times it is found that a student will use the improper finger in operating a key. Once this improper habit has been established it is difficult to overcome. It has been established by a major segment of educators that learning will be facilitated if error responses do not occur, and are thus not practiced.

Accordingly, one object of the present invention is to provide an improved technique for teaching typing on a typewriter by inhibiting the practicing of error responses.

Another object of the present invention is to provide a teaching typewriter that permits only the proper finger to operate each key. For example, the left middle finger has been determined to operate effectively only the keys E, D, C and the 3. In accordance with the invention means are provided for permitting this left middle finger to operate those keys but when the left middle finger attempts to operate any other keys interlocking means are operated to prevent the depression or the operation of any other keys by that particular finger.

A further object of the present invention is to provide a teaching typewriter that is relatively simple in construction and can be easily fabricated by some simple modifications to an existing typewriter structure.

SUMMARY OF THE INVENTION

To accomplish the foregoing and other objects of this invention there is provided a teaching typewriter that may have a conventional keyboard array. The basic typewriter is modified to include a plurality of electromechanical devices each associated with a key of the typewriter. In a preferred embodiment the key travel can be prevented by the electromechanical means being in a relaxed de-energized position and key travel can occur with the activation or energization of the electromechanical means. Each electromechanical means preferably also has an indicator light associated therewith with all the indicator lights forming an alpha-numeric display which indicates which key is about to be depressed. Conductive means are carried by each finger of an operator or student at the typewriter. In the preferred embodiment a pair of gloves is worn by the student having wires terminating at the finger tips where there is provided a conductive patch or tab. One wire goes to each fingertip in each glove thus providing a total of 10 wires. Means are provided defining preferably 10 separate circuit paths with each circuit path corresponding to a wired finger. The circuit path is completed only when a particular finger touches or slightly depresses a proper key associated with that finger to thereby operate the electromechanical means associated with that key to thereby permit operation of the key. If a particular key is touched or partially depressed by an improper finger; that is one which has been predetermined not to be associated with that finger, then the circuit path is not completed and the electromechanical means associated with the key is maintained de-energized to thereby inhibit complete operation of that key. If a key is struck by the correct finger, a visual display will light indicating the key that has been struck. The display will occur before the key is irrecoverably depressed, so that a student upon seeing the display may change his or her mind about depressing the key all the way. In the disclosed embodiment the key has a conductive pad on its surface which is wired to a contact associated with the key which closes upon slight depression of the key. In an alternative embodiment the contact associated with the key may be eliminated in which case the circuit path is completed simply upon a touching of a finger to the proper key. The circuitry of the invention may comprise a transformer having 10 secondary windings with one side of each winding coupling to a corresponding conductive means on the finger and the other side of the winding connecting in common to a plurality of electromechanical means such as relay coils each of which is associated with a pedetermined key that can be properly operated by that finger.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
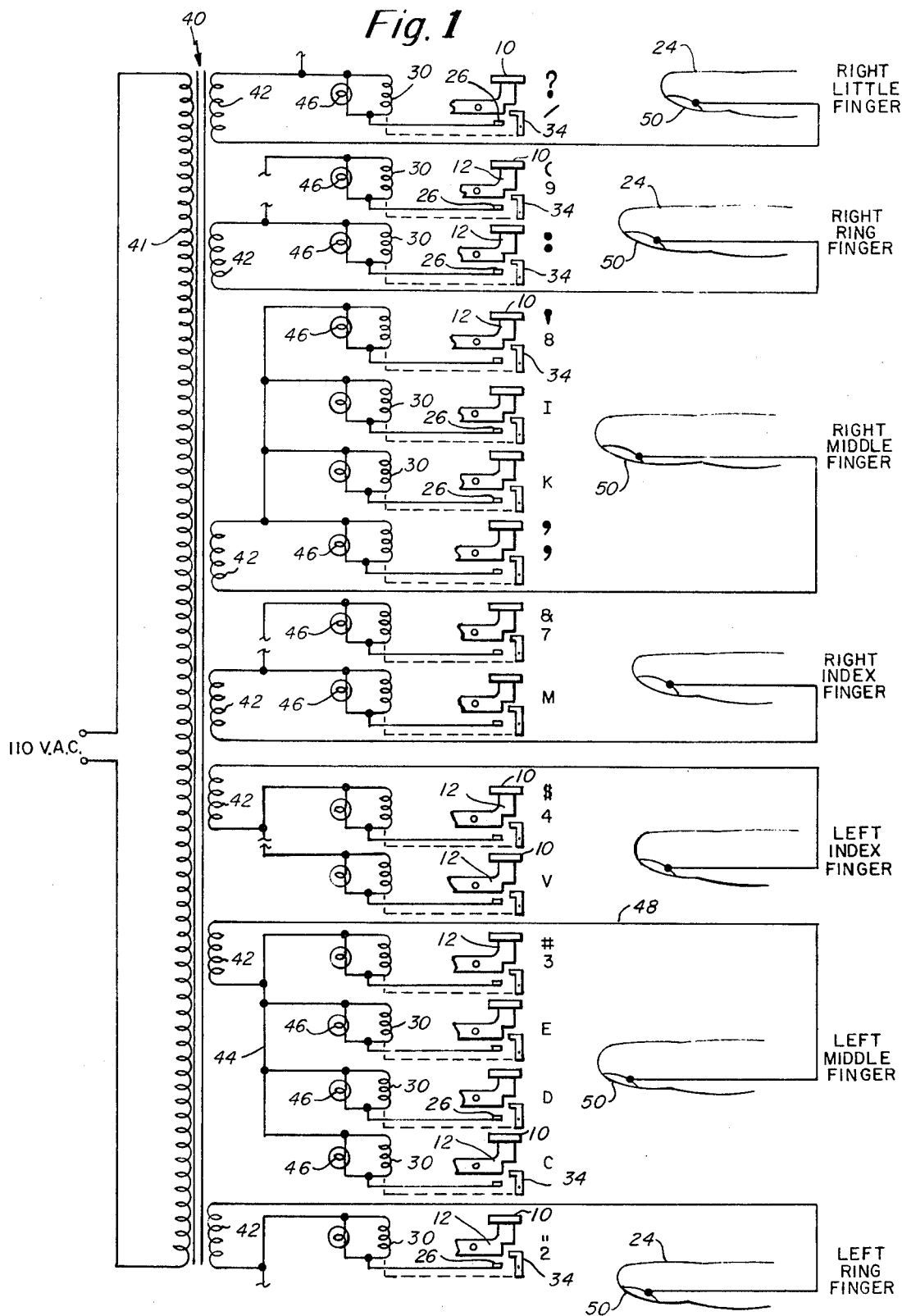
FIG. 1 shows a typical key of the teaching typewriter with its associated lockout relay.

FIG. 1 schematically depicts one key of a typewriter keyboard and an associated electromechanical device for enabling or inhibiting operation of the key depending upon the state of the electromechanical device. The typewriter key 10 is connected to a key lever 12 having a stepped section defining a shoulder 14. The key lever 12 pivots about fulcrum pivot point 16. A conductor wire 18 conductively interconnects the conductor surface 20 associated with key 10 to an electrical contact 22 which is suitably supported on a bottom surface of the key lever 12. The conductive surface may simply comprise an embedded metallic foil such as copper or aluminum foil. When a relatively slight pressure is applied to the key 10 by finger 24 contact 22 connects with contact 26 suitably supported below contact 22.

FIG. 1 also shows a relay coil 30 which is wired as shown and discussed in more detail hereinafter in FIG. 2. The relay coil 30 is shown in de-energized position with the spring 32 maintaining the armature 34 against a stop 35. The armature 9 pivots about a pivot pin 36. In the position shown in FIG. 1 the coil 30 is de-energized and it is noted that the top flange 37 of the armature 34 is in an interfering position with regard to the shoulder 14 on the key lever 12. Thus, when there are no key depressions all of the keys will be held in their inhibited position by virtue of all of the armatures 34 being in a position shown in FIG. 1. The key 10 can be depressed slightly but full depression to operate the actual typewriter is not permitted in the position shown in FIG. 1. The key, however, can be depressed sufficiently to cause a closure across contacts 22 and 26.

If the correct finger is on the key 10 a circuit path is completed as discussed in more detail hereinafter with reference to FIG. 2 and the relay coil 30 is energized. This action pulls the armature 34 toward the relay coil 30 thereby pivoting the armature 34 and moving the flange 37 out of a contacting position with the shoulder 14. Thus, when the coil 30 is energized the key 10 may be depressed fully. The contact 26 preferably is spring biased so that even though contact can be made with a slight depression the key is permitted to be depressed further maintaining this contact by virtue of the spring loading of contact 26. Alternatively, the contact 22 and 26 may be disposed on the side of the key for contact in that manner so as not to interfere with the bottom section of the key lever 12. Of course, when coil 30 is de-energized the spring 32 returns the armature 34 to the inhibited or locking position for preventing operation of the key 10 associated with that relay coil.

Figure 2:
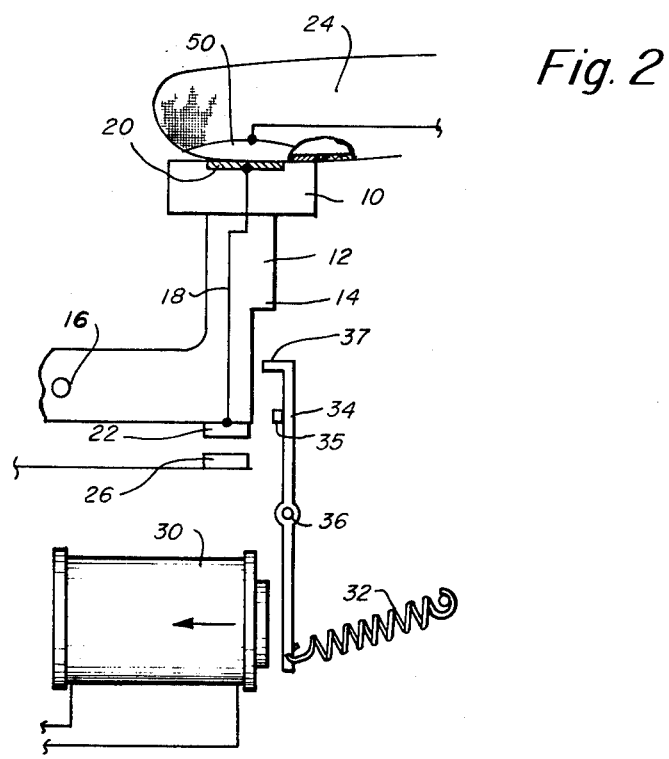
FIG. 2 shows a wiring system for one embodiment of the invention.

FIG. 2 is a circuit schematic diagram showing a portion of the overall system of a teaching typewriter in accordance with this invention. FIG. 2 shows a transformer 40 having a primary winding 41 that couples to a conventional 110 VAC line, and 10 secondary windings 42 each of which comprises a part of a circuit path with each circuit path and associated winding being completely separate from all of the other circuit paths and associated secondary windings. FIG. 2 shows the keys associated with some of the fingers of the right and left hand. Obviously, other ones of the secondary windings 42 couple to other relay coils 30 associated in groups with other keys comprising the total keyboard of the typewriter. In FIG. 2 like reference characters are used to identify like parts as shown in FIG. 1.

One side of each winding 42 couples by way of common line 44 to each of the relay coils 30. An alpha-numeric indicator light 46 is disposed in parallel with each of the coils 30. Each of the coils 30 in turn connects in the circuit path to one of the contacts 26. The other side of winding 42 couples by way of line 48 to a conductive fabric or pad 50 which may be sewed into the glove finger. The operator or student dons the gloves and each finger including the thumb of each glove has a conductor wire 48 associated therewith that connects to a conductor pad 50 at the fingertip of each glove finger.

In FIG. 2 the left middle finger is shown as being associated with four proper keys which correspond to the letters E, D and C and the key that can type either a or 3. Similarly, there is shown the right middle finger and its associated keys which include the letter keys I and K, the "," key and the key that can be used to type either a * or 8.

Suppose, for example, that the left middle finger contacts the E key, when this key is depressed sufficiently a conductive path occurs through the conductive pads 50 and 20, through the contacts 22 and 26, through the coil 30, through the secondary winding 42, and through the conductor wire 48. As soon as the contacts 22 and 26 close the coil 30 is energized and the armature 34 moves away from the shoulder 14 to permit the E key to be fully depressed for typing an upper case or lower case "E".

By way of another example, suppose that the right middle finger is used to contact the "E" key, the contacts associated with the key close but no conductive path is provided to energize the coil 30 associated with the "E" key. Because the right middle finger is not in the circuit path with the "E" key. Because each of these secondary coils 42 are independent no finger will energize any other relay coil but the ones on the same secondary winding. The indicator lights 46 which are preferably alpha-numeric lights are illuminated when the associated coil is energized. Thus, if a student lightly depresses one of the keys the associated light is illuminated. These lights may be typically disposed in an array and in a position corresponding to the position of the keys on the keyboard of the typewriter.

In the embodiment shown in FIGS. 1 and 2 there is a set of contacts 22 and 26 which must close in order to complete the circuit path. In an alternative embodiment these contacts may be removed and the wire 18 shown in FIG. 1 may couple directly to the coil 30. With this arrangement the circuit path is completed as soon as the fingers are placed on a key, if it is the proper key, and there is not need to even slightly depress the key in order to obtain an indication of whether it is the proper key or not. Having described a limited number of embodiments of this invention it should now be apparent to those skilled in the art that numerous modification can be made to this invention all of which are contemplated as falling within the scope of this invention as defined by the appended claims.

What is claimed is:

1. A system for use with a typewriter including a keyboard having keys, said system comprising;
    a plurality of blocking means associated, respectively, with each key capable of assuming two different positions, one for permitting key depression and one for preventing key depression,
    each said blocking means being operable independent of the other blocking means,
    glove means worn by the operator having a plurality of conductive patches, one at the tip of each finger of the glove means,
    and means defining a plurality of separate circuit paths each including first conductor means extending from the conductive patch, means defining a potential difference source coupled to the first conductor means, electromechanical means coupled to the potential difference source for operating said blocking means and second conductor means associated with the key and coupling to the electromechanical means whereby an electrical path is completed between the potential difference source and the electromechanical means when the proper key is depressed to operate the blocking means to its key depression permitted position.

2. A system as set forth in claim 1 wherein each circuit path includes contact closure means associated with movement of the key for completing the circuit path upon slight depression of the proper key.

3. A system as set forth in claim 1 wherein said means defining a potential difference source comprises a transformer having a primary winding and at least the same number of secondary windings as there are separate circuit paths.

4. A system as set forth in claim 1 including a key support lever, said blocking means including a movable member contacting the key support lever in one position of the electromechanical means for preventing complete depression of the key.

5. A system as set forth in claim 4 wherein said electromechanical means comprises a relay coil and said movable member is arranged to pivotally respond to energization of the relay coil.

6. A system as set forth in claim 5 wherein said movable member includes an elongated armature and said key support lever has an undercut shoulder contacted by an end of the armature.

7. A system for use with a typewriter including a keyboard having keys, said system comprising:
a plurality of blocking means associated respectively, with each key capable of assuming two different positions, one for permitting key depression and one for preventing key depression,
means worn by the operator having a plurality of conductive patches, one at the tip of each finger of the means,
and means defining a plurality of separate circuit paths including a transformer having a primary winding and at least the same number of secondary windings as there are separate circuit paths,
each said path comprising, in addition to said secondary winding, electro-mechanical means responsive to contact of the conductive patch with the proper key to complete the circuit path thereby operating the blocking means to its key depression permitted position.

8. A system as set forth in claim 7 wherein said circuit path further comprises first conductor means coupling from the conductive patch, and second conductor means associated with the key and coupling to the electromechanical means whereby an electrical path is completed between the secondary winding and the electromechanical means when the proper key is depressed to operate the blocking means.

9. A system as set forth in claim 8 wherein the secondary winding has one end connected to the first conductor means and the other end connected to the electromechanical means.

10. A system as set forth in claim 9 wherein said electromechanical means comprises a relay.

11. A system as set forth in claim 10 including a plurality of relays having one side connected in common.

* * * * *